US010460649B2

(12) United States Patent
Thien

(10) Patent No.: US 10,460,649 B2
(45) Date of Patent: Oct. 29, 2019

(54) AUTOMATICALLY SELECTING A SET OF PARAMETER VALUES THAT PROVIDE A HIGHER LINK SCORE

(71) Applicant: Dell Products L. P., Round Rock, TX (US)

(72) Inventor: Vui Khen Thien, Sengkang New Town (SG)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 15/801,981

(22) Filed: Nov. 2, 2017

(65) Prior Publication Data

US 2019/0130815 A1 May 2, 2019

(51) Int. Cl.
G09G 3/20 (2006.01)
G06F 3/00 (2006.01)
G06F 13/00 (2006.01)

(52) U.S. Cl.
CPC ............. *G09G 3/2096* (2013.01); *G06F 3/00* (2013.01); *G06F 13/00* (2013.01); *G09G 2320/0247* (2013.01); *G09G 2370/047* (2013.01); *G09G 2370/10* (2013.01); *G09G 2370/12* (2013.01); *G09G 2370/14* (2013.01); *G09G 2370/22* (2013.01)

(58) Field of Classification Search
CPC ... G09G 3/2096; G06F 13/00; G06F 13/4081; G06F 13/4282
See application file for complete search history.

(56) References Cited

U.S. PATENT DOCUMENTS

| 7,853,731 B1* | 12/2010 | Zeng | G09G 5/006 710/17 |
|---|---|---|---|
| 2010/0031098 A1* | 2/2010 | Kobayashi | G06F 3/14 714/715 |
| 2011/0317751 A1* | 12/2011 | Roethig | H04L 25/03885 375/232 |
| 2012/0079162 A1* | 3/2012 | Jaramillo | G09G 5/006 710/316 |

(Continued)

OTHER PUBLICATIONS

Teledyne Lecroy, Essential of DisplayPort Protocols at HBR3 Link Rates—8.1 Gbps, Jun. 2017 (Year: 2017).*

*Primary Examiner* — Tim T Vo
*Assistant Examiner* — Phong H Dang
(74) *Attorney, Agent, or Firm* — Campbell Stephenson LLP; Shiv S. Naimpally

(57) ABSTRACT

In some implementations, a display controller controlling a video input of a display device may select a first set of parameter values from multiple sets of parameter values to configure the video input. After receiving a request from a video source, the display controller may initiate link training. After the link training is completed, the display controller may generate a current link score, determine that the current link score is greater than a stored link score, set a value of the stored link score to be the current link score, and store the first set of parameter values. After selecting each set of parameter values from the multiple sets of parameter values, the display controller may configure the video input of the display device based on the set of parameter values from the multiple sets of parameter values that generated the stored (highest) score.

20 Claims, 5 Drawing Sheets

(56) References Cited

U.S. PATENT DOCUMENTS

2012/0317607 A1\* 12/2012 Wyatt .................... G09G 5/006
725/127
2013/0086292 A1\* 4/2013 Hsieh ..................... G09G 5/006
710/302

\* cited by examiner

Link Score Description

| Bits | Value | Description |
|---|---|---|
| Bit 15 – Bit 14 | 0x0 | Link training did not start |
| | 0x1 | Clock recovery failed |
| | 0x2 | Clock recovery successful; symbol lock failed |
| | 0x3 | Link training successfully completed |
| Bit 13 | 0x0 | Video signal is not detected after link training |
| | 0x1 | Video signal is detected after link training |
| Bit 12 – Bit 11 | 0x0 | ALSE per minute >= 300 or no signal |
| | 0x1 | 100 <= ALSE < 300 |
| | 0x2 | 0 < ALSE < 100 |
| | 0x3 | ALSE = 0 (error free) |
| Bit 10 | 0x0 | Video mode/timing unstable (mode re-setup to be performed) |
| | 0x1 | Video mode is stable |
| Bit 9 ... Bit 0 | | Reserved for future use |

ALSE = Average Link Symbol Error

FIG. 2

PARAMETER SPACE 138 = {P1, P2, ..., PN}

$P_1 = $ [$a_{0,0}, a_{0,1}, \ldots, a_{0,K1}$] [$a_{1,0}, a_{1,1}, \ldots, a_{1,K1}$] ... [$a_{j1,0}, a_{j1,1}, \ldots, a_{j1,K1}$]

$P_N = $ [$a_{0,0}, a_{0,1}, \ldots, a_{0,KN}$] [$a_{1,0}, a_{1,1}, \ldots, a_{1,KN}$] ... [$a_{jN,0}, a_{JN,1}, \ldots, a_{JN,KN}$]

FIG. 3

AUTOMATICALLY SELECTING A SET OF PARAMETER VALUES THAT PROVIDE A HIGHER LINK SCORE

BACKGROUND OF THE INVENTION

Field of the Invention

This invention relates generally to display devices using DisplayPort to receive a video signal, and more specifically, to reducing issues between a display device that is connected via a DisplayPort link to a computing device by automatically improving a link score associated with the DisplayPort link.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Video interoperability issues, particularly between a first vendor's display device ("monitor") and a second vendor's computing device ("computer") are common. Moreover, video standards are constantly evolving to support more features (e.g., multiple monitors) and higher resolutions, making it difficult for vendors to completely eliminate interoperability issues. Compatibility issues can arise for a variety of reasons. For example, intermittent issues (e.g. signal margin) may arise that may not be identifiable from testing a small sample size of monitors. The system exhibiting incompatibility issues may not have been available for testing when the monitor was being developed. Some limitations may be caused by performance trade-offs. For example, short detection times may cause either the monitor or the computer to be overly sensitive to timing instabilities. A customer may use a first vendor's monitor connected to a second vendor's computer that is not compliant with one or more video standards (e.g., Video Electronics Standards Association (VESA) standards). Such compatibility issues may prevent monitor vendors from being able to fine-tune hardware settings during development to universally work with all video sources, including existing products or future products.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a display controller controlling a video input of a display device may select a first set of parameter values from multiple sets of parameter values to configure the video input. After receiving a request from a video source, the display controller may initiate link training. After the link training is completed, the display controller may generate (e.g., calculate) a current link score, determine that the current link score is greater than a stored link score, set a value of the stored link score to be the current link score, and store the first set of parameter values. After selecting each set of parameter values from the multiple sets of parameter values, the display controller may configure the video input of the display device based on the set of parameter values from the multiple sets of parameter values that generated the stored (highest) score.

BRIEF DESCRIPTION OF THE DRAWINGS

A more complete understanding of the present disclosure may be obtained by reference to the following Detailed Description when taken in conjunction with the accompanying Drawings. In the FIGURES, the left-most digit(s) of a reference number identifies the Figure (FIG.) in which the reference number first appears. The same reference numbers in different Figures indicate similar or identical items.

FIG. 2 is a table describing the meaning of the bits in a link score according to some embodiments.

FIG. 3 is a block diagram illustrating a parameter space of DisplayPort parameters according to some embodiments.

DETAILED DESCRIPTION

Figure 1:
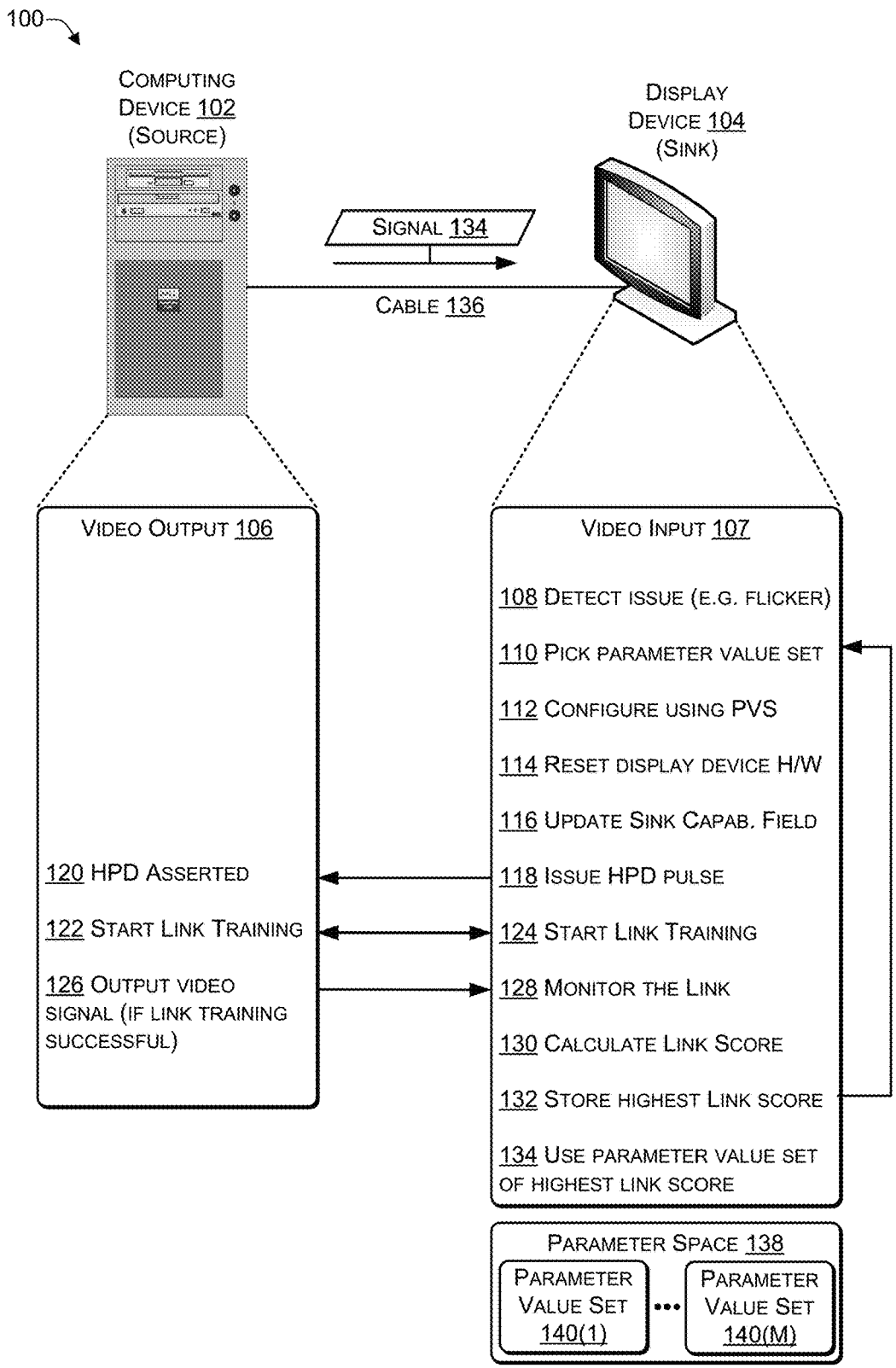
FIG. 1 is a block diagram of an architecture that includes a computing device and a display device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable a display device that is connected via a DisplayPort link to a computing device to automatically vary the values of a specific set of parameters associated with the DisplayPort link to determine a particular set of values that results in a high link score, thereby reducing one or more issues (e.g., flickering). The link score is a 16-bit value that indicates various error flags and quality measurements ordered from most significant bit (MSB) to least significant bit (LSB) in order of significance. A higher value link score indicates a better link. For example, the issues may be due to differences in the way the DisplayPort protocol is implemented in each device. The system and techniques enable a display device connected to a video source to automatically cycle through sets of parameter values to identify a set of parameter values that has the highest link score to reduce or eliminate issues (e.g., flickering) associated with the DisplayPort link. During the process, a display controller searches for a set of vectors (e.g., a pre-defined set of parameters values) from a vector space that yield the highest link score. The display controller may de-assert and re-assert the Hot Plug Detect (HPD) status each time the parameter values are modified, and measure the resulting link score. After the display controller has cycled through the pre-defined set of parameters, the parameters values (e.g., vectors) that generate the highest link score may be selected and applied to configure the DisplayPort link.

When the display device is initially being developed, multiple sets of parameters that affect the PHY (e.g., video performance), the link, and timing detection of the display controller of the display device may be identified. PHY refers to the physical layer of the Open Systems Interconnection (OSI) model, e.g., the circuitry used to implement physical layer functions. The multiple sets of parameters may be referred to as a parameter space. Each set of parameters may be orthogonal in that changing a set of vectors in the parameter space may not affect (or minimally affect) the performance of the other sets of parameters. Each parameter may have a particular number of possible values that can be varied, resulting in a different trade-off in the receiver's performance A particular value for each parameter may be used as a default value for each parameter, resulting in a default set of parameter values being established during product development.

When a user encounters a compatibility issue between the video signal provided by a computing device and the video receiver of a display device, the issue may visually manifest in the form of a screen flicker or another undesirable visual artifact. In some cases, the user may initiate the process of varying the values of parameters in the parameter space to identify and set one or more parameter values that address the compatibility issue. For example, the user may initiate the process using an On-Screen Display (OSD) of the display device or by using a software program being executed by the computing device to issue a Display Data Channel command interface (DDCCI) command from the computing device. In other cases, the display device's receiver may initiate the process of setting the values of parameters using a set of parameters from the parameter space to identify one or more values that address the compatibility issue. For example, the display device's receiver may automatically initiate the process in response to detecting a particular event, e.g., each time the video cable of the display device is connected to the computing device. As another example, the display device's receiver may automatically initiate the process in response to detecting a particular issue (e.g., incompatibility issue) with the video signal being received from the computing device. For example, one or more of the video signal's parameters may be outside of a particular range of values. To illustrate, the receiver may expect to receive a particular parameter with a value within a particular range but may receive values that are outside the particular range.

During the process, the firmware of the display device may sequentially select and apply a set of parameter values to a display controller of the display device. Each time the parameter values are changed, an HPD or an interrupt request (IRQ) pulse may be sent to the video source of the computing device to re-initiate link training. After link training is complete, the display controller in the display device may monitor the DisplayPort link for a pre-determined period of time (e.g., N seconds, where N>0) and generate (e.g., determine or calculate) a link score (e.g., associated with the parameter value) after the pre-determined period of time. After applying each set of parameter values in the parameter space, the set of parameter values yielding the highest link score may be used to configure the display controller.

Thus, different sets of parameter values may be selected and applied. After each set of parameter values is applied, a link score may be determined. The set of parameter values that provides the highest link score may be selected and used to configure the display device. The parameters that may be varied may include, for example, DisplayPort auxiliary channel (e.g., differential or single ended), hot plug detect (HPD) pulse width, DisplayPort lane configuration in DisplayPort configuration data (DPCD) (e.g., MAX_LANE_COUNT, MAX_LINK_RATE, MSTM_CAP, and the like), DisplayPort Receiver PHY related settings, PLL (Phase-Locked Loop) related settings, EQ (Equalizer) related settings, differential voltage sensitivity settings (for squelch/un-squelch), device firmware related parameters (e.g., timeout for timing detection), and other DisplayPort related parameters.

For example, a display device may include a display panel, a display controller to control a video input of the display panel, one or more processors, and one or more non-transitory computer readable media storing instructions executable by the one or more processors to perform various operations. The operations may include selecting a first set of parameter values from multiple sets of parameter values and configuring the video input based at least in part on the first set of parameter values. The operations may include initiating a reset of hardware associated with the video input, sending, to the video source, one of a hot plug detect (HPD) pulse or an interrupt request (IRQ), and updating a receiver capability field in DisplayPort configuration data (DPCD) associated with the video input of the display device. The operations may include receiving a request, from a video source that is connected to the video input, to initiate link training. The operations may include initiating the link training in response to receiving the request. After the link training is successfully completed, the operations may include calculating a link score, determining that the link score is greater than a highest link score, setting the highest link score to the link score, and storing the first set of parameter values to create a stored set of parameter values. After determining that each set of parameter values from the multiple sets of parameter values has been selected, the video input of the display device may be configured based at least in part on the stored set of parameter values (from the multiple sets of parameter values) that resulted in the highest link score.

The operations may include selecting a second set of parameter values from the multiple sets of parameter values and configuring the video input of the display device based at least in part on the second set of parameter values. After receiving a second request from the video source to initiate a second link training, the operations may include initiating the second link training and calculating a second link score (e.g., after the link training is successfully completed). Based at least in part on determining that the second link score is less than or equal to the highest link score, the operations may include selecting a third set of parameter values.

An individual set of parameter values from the multiple sets of parameter values may include at least one of: a first parameter value indicating whether an auxiliary channel is configured as differential channel or a single ended channel, a second parameter value indicating a width of the HPD pulse, a third parameter value indicating a maximum number of lanes, a fourth parameter value indicating a maximum link rate, a fifth parameter value indicating whether or not there is support for multi-stream transport message transaction/sideband message handling, a sixth parameter value indicating physical layer (PHY) related settings, a seventh parameter value indicating phase-locked loop (PLL) related settings, an eighth parameter value indicating equalizer (EQ) related settings, a ninth parameter value indicating a differential voltage sensitivity setting, and a tenth parameter value indicating a timeout for timing detection.

FIG. 1 is a block diagram of an architecture 100 that includes a computing device 102 and a display device 104 according to some embodiments. The computing device 102 may include a graphics processor that may be integrated with a central processing unit (CPU) or separate from the CPU. The computing device 102 may include a video output 106, such as, for example, a DisplayPort output. The video output 106 of the computing device 102 may be coupled to a video input 107 of the display device 104 using a DisplayPort compatible cable 136 (or other connection, such as USB-C).

While the video input 107 of the display device 104 is connected to and receiving a video signal 134 from the video output 106 of the computing device 102, at 108, an issue may be detected. For example, the issue may include screen flicker or another type of undesirable video artifact, a weak signal, one or more signal parameters that are outside bounds defined by the DisplayPort specification, or the like. In some cases, the display controller of the display device 104 may detect the issue and initiate the process of modifying parameter values (as described herein). In other cases, a user viewing the display device 104 may detect the issue and initiate the process of modifying parameter values (as described herein) via controls (e.g., on screen display (OSD)) of the display device 104, or via a software application being executed by the computing device (e.g., the user may use the application to issue a DDCCI command or equivalent).

The process is briefly described in FIG. 1, while a more detailed process is described in FIG. 3. Before the process is initiated, the display device 104 may display a message on the computing device 102 indicating that an automatic signal adjustment process is about to begin that could take several minutes to complete. The message may also ask a user to set a "turn the display off" parameter to "never", set a "put computer to sleep" parameter to "never", and connect the computing device 102 to alternating current (A/C) power if the computing device 102 is a portable device using battery power.

At 110, a set of parameter values 140(M) (where M>0) from a parameter space 138 (e.g., identified during product development) may be selected. At 112, the set of parameter values 140(M) may applied to configure the display device 104. At 114, a display controller in the display device 104 may be reset. At 116, a sink capability field may be updated. The display device 104 may be configured as a sink device relative to the signal 134 from the video output 106. The sink capability field may be updated using the "Receiver Capability Field" in the DisplayPort configuration data (DPCD). This may be performed if the receiver capability field is one of the parameters that may be modified by the set of parameter values 140(M). At 118, the display device 104 may issue a hot plug detect (HPD) pulse (or IRQ) over the cable 136 to the video input 107. When a source device (e.g., the computing device 102) is connected to a sink device (e.g., the display device 104), using a cable, such as a high definition multimedia interface (HDMI) cable, an HPD event may be automatically initiated. In addition, the sink device can simulate the cable 136 being connected to between the video output 106 and the video input 107 by issuing an HPD pulse to the source.

At 122, the video output 106 may send a request to initiate link training with the display device 104 and, at 124, the display device 104 may respond to the link training request by participating in the link training. During the link training, Extended Display Identification Data (EDID) information from the sink device may be read and a format/resolution may be negotiated. The EDID is a data structure provided by the digital display device 104 to describe its capabilities to a video source, such as the computing device 102.

If the link training has been successfully completed, then at 126, the video output 106 may output a video signal. At 128, the display device 104 may monitor the link (e.g., established over the cable 136) and, at 130, generate (e.g., calculate or determine) a link score. The link score is a 16-bit value, with error flags and quality measurements associated with the link ordered from most significant bit (MSB) to least significant bit (LSB) in order of significance (e.g., importance). The higher the value of the link score, the better the quality of the transmission of the video signal.

At 132, the display device 104 may keep track of a highest link score and determine if the current link score is greater than the highest link score. If the current link score is greater than the highest link score, the highest link score may be set to the current link score and the associated set of parameter values 140 that yielded the highest link score may be stored. If the current link score is less than or equal to the highest link score, then the next set of parameter values from 140(1) to 140(M) may be selected (e.g., at 110), the display device 104 may keep track of a highest link score generated by applying each set of parameter values. For example, the link score that is determined initially for the first set of parameter values may be the highest link score. As another example, when one or more issues are detected, the display controller may generate a link score before initiating the process of trying different sets of parameter values. Each subsequently generated link score may be compared to the highest link score and, if the subsequently generated link score is higher, the highest link score may be set to the subsequently generated link score. This process may be repeated, e.g., a set of parameter values may be selected and applied, and a link score determined after each set of parameter values is applied, until all the parameter value sets 140 have been selected and applied. After each of the parameter value sets 140(1) to 140(M) have been applied, the particular parameter value set that resulted in the highest link score may be used to configure (e.g., set) the DPCD, at 134.

Thus, during product development, a display device's video signal input circuitry may be analyzed to identify multiple sets of parameter values that potentially affect the signal quality of the display device. When the display device is operational, e.g., connected to a computing device that is outputting a video signal, the display device may monitor the video signal. If a problem is detected with the video signal, a process to improve the link score may be initiated. During the process, each parameter set from the parameter space may be selected in turn and the link determined. The display device keeps track of the parameter value set that resulted in a highest link score (or a link score higher than a threshold amount). After all the multiple sets of parameter values in the parameter space have been selected, the particular set of parameter values resulting in the highest link score may be used to configure (e.g., set) the display controller of the display device. The parameters that may be varied may include, for example, DisplayPort auxiliary channel (e.g., differential or single ended), hot plug detect (HPD) pulse width, DisplayPort lane configuration in DisplayPort configuration data (DPCD) (e.g., MAX_LANE_COUNT, MAX_LINK_RATE, MSTM_CAP, and the like), DisplayPort Receiver PHY related settings, PLL (Phase-Locked Loop) related settings, EQ (Equalizer) related settings, differential voltage sensitivity settings (for squelch/un-squelch), device firmware related parameters (e.g., timeout for timing detection), and other DisplayPort related parameters.

FIG. 2 is a table 200 describing the meaning of the bits in a link score according to some embodiments. The link score indicates the condition of the link, including whether link training started, whether clock recovery was successful, whether the symbol lock failed, whether link training was successful, whether or not a video signal was detected after link training, whether there were link symbol errors and if so a range of the average number of link symbol errors per minute, whether or not video mode is stable, and the like.

FIG. 3 is a block diagram 300 illustrating the parameter space 138 of DisplayPort parameters according to some embodiments. The parameter space 138 may be identified during product development of a display device. The parameter space 300 may include multiple sets (e.g., P1 to PN) of vectors, where the number of parameters are from 0 to J, and the value of each parameter is from 0 to K.

For example, assume the display device 104 of FIG. 1 is a Dell® product connected to the computing device 102, which is a non-Dell® product. Assume that the issue is that the video signal is not being displayed by the display device 102. The root cause may be that the source device (the computing device 102) is communicating via Auxiliary Channel using Single Ended Mode (e.g., instead of Differential Mode, as recommended in the DisplayPort specification). In this example, one of the parameters 140 in the parameter space 138 may be the Auxiliary Channel, and the value may be modified from Single Ended Mode to Differential Mode.

TABLE 1

| Parameter Set P0 | Parameter | P0, Set 0 (default) | P0, Set 1 |
|---|---|---|---|
| P0 = | AuxModeReg1 | 0x41 | 0x30 |
| | AuxModeReg2 | 0x01 | 0x00 |
| | AuxModeInitFuncPtr | &DiffAuxInit | &SEAuxInit |

In this simplified example (see Table 1), P0 has three parameters, AuxModeReg1, AuxModeReg2, and AuxModeInitFuncPtr. The process selects a set of parameter values, e.g., Set 0 or Set 1, in turn, and determines the effect that each set of values has on the link. For example, each time a set of parameter values change, an HPD or IRQ (interrupt request line) is sent to the source (e.g., the computing device 102) to re-initiate link training. After each link training has been completed, a new link score is determined Assume the link score for Set 0 is 0x0000 and the link score for Set 1 is 0xFC00. Based on these results, the process may select the set of parameter values P0 Set 1 because the values in Set 1 result in a higher link score than the values in Set 0.

While the above example, illustrates changing the DisplayPort Auxiliary Channel parameter from single-ended to differential, other parameters that may be varied may include, for example, a pulse width of the HPD, a DisplayPortLane configuration in the DPCD (e.g., max_lane_count, max_link_rate, mstm-cap, and the like), Displayport receiver PHY settings (e.g., PLL, EQ, differential voltage sensitivity settings, and the like, device firmware parameters (e.g., timeout for timing detection), and other parameters determined during product development.

Figure 4:
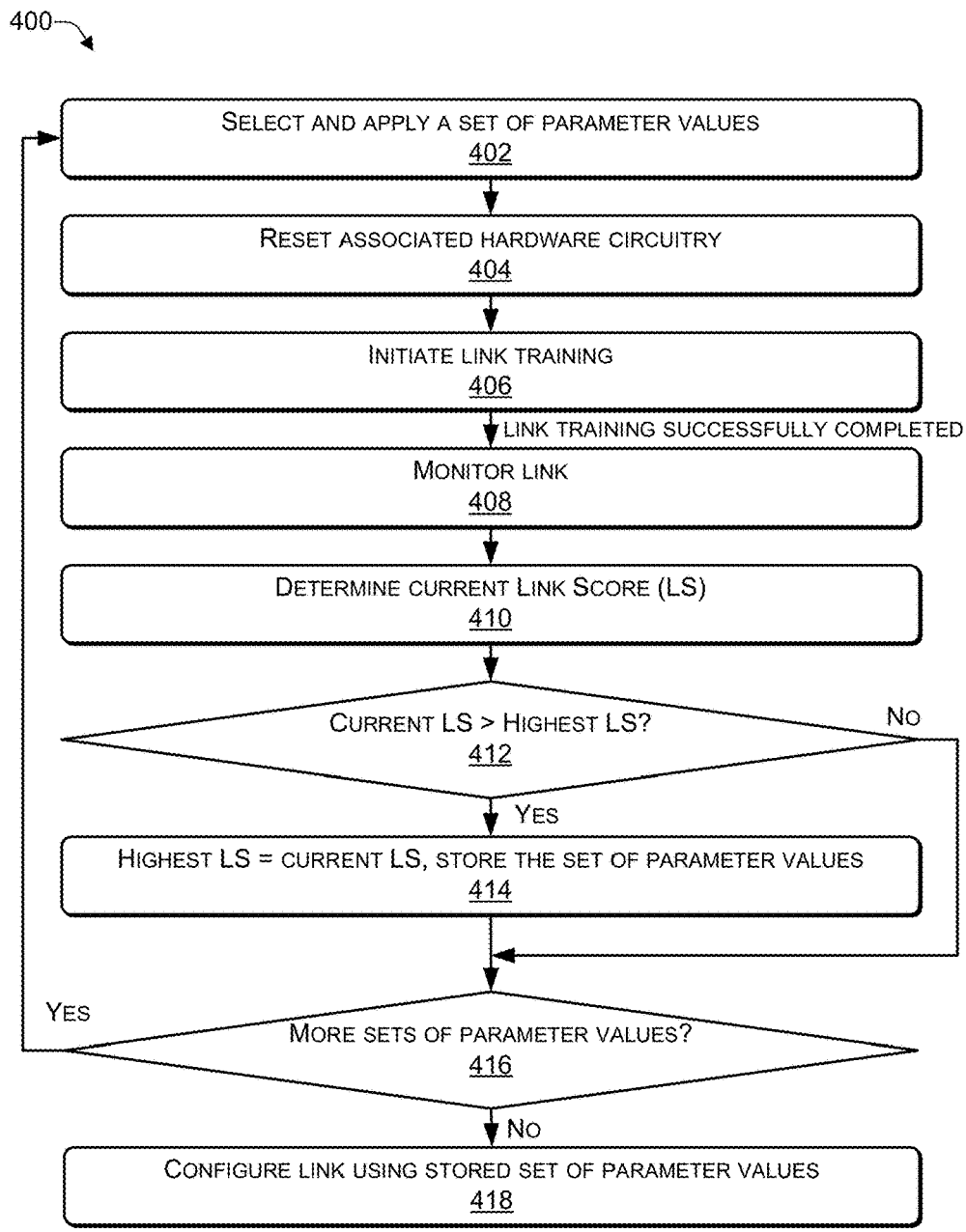
FIG. 4 is a flowchart of a process that includes selecting a parameter and incrementing the parameter value according to some embodiments.

In the flow diagram of FIG. 4, each block represents one or more operations that can be implemented in hardware, firmware, software, or any combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIG. 1, 2, or 3 as described above, although other models, frameworks, systems and environments may be used to implement these processes.

FIG. 4 is a flowchart of a process 400 that includes selecting a parameter and incrementing the parameter value according to some embodiments. The process may be performed by a display controller of a display device, such as the display device 104 of FIG. 1.

At 402, a set of parameter values may be selected and applied (e.g., to configure a display controller of a display device). At 404, associated hardware circuitry (e.g., associated with receiving a signal from a source) may be reset. In some cases, a sink capacity field may be updated. For example, in FIG. 1, the display device 104 may select one of the parameter value sets 140(1) to 140(M) from the parameter space 138 and use the selected set of parameter values to configure the display controller of the display device 104. The display device 104 may reset hardware, such as a display controller of the display device 104, associated with the link. In some cases, e.g., the sink capability field may be updated using the "Receiver Capability Field" in the DPCD if the receiver capability field is one of the parameters modified by the selected set of parameter values.

At 406, link training may be initiated. For example, in FIG. 1, the display device 104 may send a signal, such as an HPD, IRQ, or the like, that causes the video source (e.g., the computing device 102) to initiate link training. Receiving a request from the video source to initiate link training may cause the display device 104 to participate in the link training.

At 408, the link may be monitored. At 410, a current link score may be determined (e.g., based on the monitoring). For example, in FIG. 1, after the link training has been successfully completed, the display device 104 may monitor the link for a pre-determined period of time. After the pre-determined period of time, the display device 104 may determine the link score associated with the link (e.g., based on the monitoring).

At 412, a determination may be made whether the current link score is greater than a (previously determined) stored (e.g., highest) link score. In response to determining, at 412, that "yes" the current link score is greater than the previously determined highest link score, the process proceeds to 414. In response to determining, at 412, that "no" the current link score is not greater than the (previously determined) stored (e.g., highest) link score, the process proceeds to 416. In some cases, prior to 402, the display controller may determine a current link score and store the current link score to create the stored link score. In other cases, prior to 402, the link score may be initialized to zero and stored to create the stored link score.

At 414, the stored (highest) link score may be assigned the value of the current link score and the (current) set of parameter values (e.g., that yielded the highest link score) may be stored. If the current link score is greater than the previously determined stored (highest) link score, then the stored (highest) link score may be assigned the value of the current link score and the current set of parameter values (e.g., selected at 402) may be stored.

At 416, a determination may be made whether there is at least one additional set of parameter values that have not been selected. In response to determining, at 416, that "yes" there is at least one additional set of parameter values have not been selected, then the process may proceed to 402, where a next set of parameter values may be selected and applied. In response to determining, at 416, that "no" there are no additional sets of parameter values to be selected, then the process may proceed to 418, where the stored set of parameter values that yielded the stored (highest) link score may be applied to configure the display controller of the display device. For example, in FIG. 1, after each of the multiple sets of parameter values 140(1) to 140(M) have been selected in turn, the stored set of parameter values may be retrieved and used to configure the link between the computing device 102 and the display device 104, thereby achieving a highest possible link score.

Figure 5:
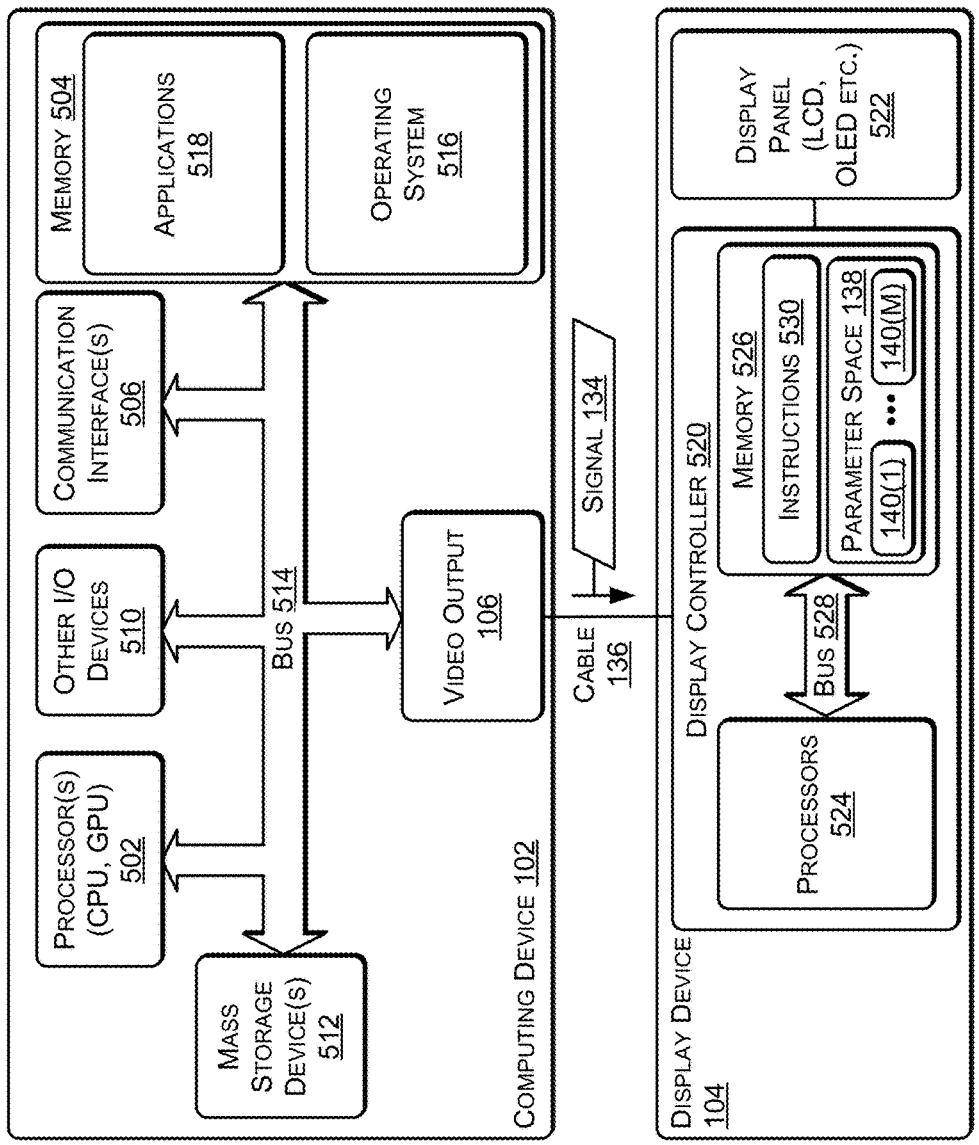
FIG. 5 illustrates an example configuration of a display device that can be used to implement the systems and techniques described herein.

FIG. 5 illustrates an example configuration of the computing device 102 and the display device 104 of FIG. 1 that can be used to implement the systems and techniques described herein. The computing device 102 may include one or more processors 502 (e.g., a CPU and/or a GPU), a memory 504, communication interfaces 506, other input/output (I/O) devices 510, the video output 106 (e.g., controlled by the GPU), and one or more mass storage devices 512, configured to communicate with each other, such as via one or more system buses 514 or other suitable connection. While a single bus is illustrated for ease of understanding, it should be understood that the system buses 514 may include multiple buses, such as memory device buses, storage device buses, power buses, video signal buses, and the like.

The processors 502 are one or more hardware devices that may include a single processing unit or a number of processing units, all of which may include single or multiple computing units or multiple cores. While the processors 502 are illustrated as including an integrated GPU, in some cases the GPU may be a separate processor device. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for physically storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like.

The computing device 102 may also include one or more communication interfaces 506 for exchanging data via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 506 can also provide communication with external storage (not shown), such as in a storage array, network attached storage, storage area network, or the like. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store an operating system 516 and software applications 518. The video output 106 may be capable of providing the signal 134 to the display device 104 via the cable 136.

The display device 104 may include a display controller 520 and a display panel 522. For example, the display panel 522 may use a technology such as liquid crystal display (LCD), light emitting diode (LED), organic LED (OLED), or another type of display technology.

The display controller 520 may send an HPD or IRQ to the computing device 102 (e.g., via the cable 136), and monitor the signal 134 to determine a link score, as described herein. The display controller 520 may include processors 524 that are coupled to a memory 526 via a bus 528. The processors 524 are one or more hardware devices that may include a single processing unit or a number of processing units, all of which may include single or multiple computing units or multiple cores. The processors 524 may be implemented as one or more microprocessors, microcomputers, microcontrollers, digital signal processors (DSP), central processing units, graphics processing units, state machines, logic circuitries, and/or any devices that manipulate signals based on operational instructions. Among other capabilities, the processors 524 may be configured to fetch and execute computer-readable instructions 530 stored in the memory 526.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  selecting, by a display controller of a display device, a first set of parameter values from multiple sets of parameter values;
  configuring, by the display controller, a video input of the display device based at least in part on the first set of parameter values;
  receiving, by the display controller, a request to initiate link training from a video source that is connected to the video input;
  initiating, by the display controller, the link training;
  generating, by the display controller, a current link score after the link training is successfully completed, wherein the link score comprises a sixteen-bit value that includes one or more error flags and one or more quality measurements ordered from a most significant bit (MSB) to a least significant bit (LSB) in order of significance;
  determining, by the display controller, that the current link score is greater than a stored link score;
  setting a value of the stored link score to be the current link score;
  storing the first set of parameter values to create a stored set of parameter values;
  determining, by the display controller, that each set of parameter values from the multiple sets of parameter values has been selected; and
  configuring, by the display controller, the video input of the display device based at least in part on the stored set of parameter values.

2. The method of claim 1, further comprising:
  selecting a second set of parameter values from the multiple sets of parameter values;
  configuring the video input of the display device based at least in part on the second set of parameter values;
  receiving a second request from the video source to initiate a second link training;
  initiating the second link training;
  calculating a second current link score;
  based at least in part on determining that the second current link score is less than or equal to the stored link score, selecting a third set of parameter values.

3. The method of claim 1, further comprising:
  initiating a reset of hardware associated with the video input.

4. The method of claim 1, further comprising:
  sending, to the video source, one of a hot plug detect (HPD) pulse or an interrupt request (IRQ).

5. The method of claim 1, further comprising:
  updating a receiver capability field in DisplayPort configuration data (DPCD) associated with the video input of the display device.

6. The method of claim 1, further comprising:
  monitoring a link between the video source and the video input for a predetermined period of time before generating the current link score.

7. The method of claim 1, wherein the first set of parameter values includes at least one of:
  a first parameter value indicating whether an auxiliary channel is configured as differential channel or a single ended channel;
  a second parameter value indicating a width of the HPD pulse;
  a third parameter value indicating a maximum number of lanes;
  a fourth parameter value indicating a maximum link rate;
  a fifth parameter value indicating whether or not there is support for multi-stream transport message transaction/sideband message handling;
  a sixth parameter value indicating physical layer (PHY) related settings;
  a seventh parameter value indicating phase-locked loop (PLL) related settings;
  an eighth parameter value indicating equalizer (EQ) related settings;
  a ninth parameter value indicating a differential voltage sensitivity setting; and
  a tenth parameter value indicating a timeout for timing detection.

8. A display device comprising:
a display panel;
a display controller to control a video input of the display panel;
one or more processors; and
one or more non-transitory computer readable media storing instructions executable by the one or more processors to perform operations comprising:
selecting a first set of parameter values from multiple sets of parameter values;
configuring the video input based at least in part on the first set of parameter values;
receiving a request to initiate link training from a video source that is connected to the video input;
initiating the link training;
generating a current link score after the link training is successfully completed,
wherein the link score comprises a sixteen-bit value that includes one or more error flags and one or more quality measurements ordered from a most significant bit (MSB) to a least significant bit (LSB) in order of significance;
determining that the current link score is greater than a stored link score;
setting a value of the stored link score to be the current link score;
storing the first set of parameter values to create a stored set of parameter values;
determining that each set of parameter values from the multiple sets of parameter values has been selected; and
configuring the video input of the display device based at least in part on the stored set of parameter values.

9. The display device of claim 8, wherein the operations further comprise:
selecting a second set of parameter values from the multiple sets of parameter values;
configuring the video input of the display device based at least in part on the second set of parameter values;
receiving a second request from the video source to initiate a second link training;
initiating the second link training;
calculating a second current link score;
based at least in part on determining that the second current link score is less than or equal to the stored link score, selecting a third set of parameter values.

10. The display device of claim 8, wherein the operations further comprise:
initiating a reset of hardware associated with the video input.

11. The display device of claim 8, wherein the operations further comprise:
sending, to the video source, one of a hot plug detect (HPD) pulse or an interrupt request (IRQ).

12. The display device of claim 11, wherein the operations further comprise:
updating a receiver capability field in DisplayPort configuration data (DPCD) associated with the video input of the display device.

13. The display device of claim 8, wherein an individual set of parameter values from the multiple sets of parameter values includes at least one of:
a first parameter value indicating whether an auxiliary channel is configured as differential channel or a single ended channel;
a second parameter value indicating a width of the HPD pulse;
a third parameter value indicating a maximum number of lanes;
a fourth parameter value indicating a maximum link rate;
a fifth parameter value indicating whether or not there is support for multi-stream transport message transaction/sideband message handling;
a sixth parameter value indicating physical layer (PHY) related settings;
a seventh parameter value indicating phase-locked loop (PLL) related settings;
an eighth parameter value indicating equalizer (EQ) related settings;
a ninth parameter value indicating a differential voltage sensitivity setting; and
a tenth parameter value indicating a timeout for timing detection.

14. One or more non-transitory computer-readable media storing instructions that are executable by one or more processors to perform operations comprising:
selecting a first set of parameter values from multiple sets of parameter values;
configuring a video input of a display device based at least in part on the first set of parameter values;
receiving a request, from a video source that is connected to the video input, to initiate link training;
initiating the link training;
generating a current link score after the link training is successfully completed, wherein
the link score comprises a sixteen-bit value that includes one or more error flags and one or more quality measurements ordered from a most significant bit (MSB) to a least significant bit (LSB) in order of significance;
determining that the current link score is greater than a stored link score;
setting a value of the stored link score to be the current link score;
storing the first set of parameter values to create a stored set of parameter values;
determining that each set of parameter values from the multiple sets of parameter values has been selected; and
configuring the video input of the display device based at least in part on the stored set of parameter values.

15. The one or more non-transitory computer-readable media of claim 14, the operations further comprising:
selecting a second set of parameter values from the multiple sets of parameter values;
configuring the video input of the display device based at least in part on the second set of parameter values;
receiving a second request from the video source to initiate a second link training;
initiating the second link training;
calculating a second current link score;
based at least in part on determining that the second current link score is less than or equal to the stored link score, selecting a third set of parameter values.

16. The one or more non-transitory computer-readable media of claim 14, the operations further comprising:
initiating a reset of hardware associated with the video input.

17. The one or more non-transitory computer-readable media of claim 8, the operations further comprising:
sending, to the video source, one of a hot plug detect (HPD) pulse or an interrupt request (IRQ).

18. The one or more non-transitory computer-readable media of claim 17, the operations further comprising:

updating a receiver capability field in DisplayPort configuration data (DPCD) associated with the video input of the display device.

19. The one or more non-transitory computer-readable media of claim 18, the operations further comprising:
monitoring a link between the video source and the video input for a predetermined period of time before generating the current link score.

20. The one or more non-transitory computer-readable media of claim 14, wherein the first set of parameter values includes at least one of:
a first parameter value indicating whether an auxiliary channel is configured as differential channel or a single ended channel;
a second parameter value indicating a width of the HPD pulse;
a third parameter value indicating a maximum number of lanes;
a fourth parameter value indicating a maximum link rate;
a fifth parameter value indicating whether or not there is support for multi-stream transport message transaction/sideband message handling;
a sixth parameter value indicating physical layer (PHY) related settings;
a seventh parameter value indicating phase-locked loop (PLL) related settings;
an eighth parameter value indicating equalizer (EQ) related settings;
a ninth parameter value indicating a differential voltage sensitivity setting; and
a tenth parameter value indicating a timeout for timing detection.

* * * * *